(12) United States Patent
Fisk et al.

(10) Patent No.: US 10,260,964 B2
(45) Date of Patent: Apr. 16, 2019

(54) OPTICAL FIBER SENSOR SYSTEM FOR DETECTING TEMPERATURE CHANGES IN AN AIRCRAFT

(71) Applicant: SAAB AB, Linkoping (SE)

(72) Inventors: Fredrik Fisk, Linkoping (SE); Bjorn-Erik Andersson, Norrkoping (SE)

(73) Assignee: SAAB AB, Linkoping (SE)

( * ) Notice: Subject to any disclaimer, the term of this patent is extended or adjusted under 35 U.S.C. 154(b) by 164 days.

(21) Appl. No.: 15/322,369

(22) PCT Filed: Jun. 25, 2014

(86) PCT No.: PCT/SE2014/050788
§ 371 (c)(1),
(2) Date: Dec. 27, 2016

(87) PCT Pub. No.: WO2015/199590
PCT Pub. Date: Dec. 30, 2015

(65) Prior Publication Data
US 2017/0138802 A1    May 18, 2017

(51) Int. Cl.
*G01K 11/00* (2006.01)
*G01J 5/00* (2006.01)
(Continued)

(52) U.S. Cl.
CPC .......... *G01K 11/3206* (2013.01); *G01K 13/00* (2013.01)

(58) Field of Classification Search
USPC ................. 374/161, 131, 141, 137
See application file for complete search history.

(56) References Cited

U.S. PATENT DOCUMENTS

| 6,204,920 B1 | 3/2001 | Ellerbrock et al. |
| 2002/0125414 A1 | 9/2002 | Dammann |

(Continued)

FOREIGN PATENT DOCUMENTS

| EP | 2 669 637 A2 | 12/2013 |
| WO | 96/36276 A1 | 11/1996 |

OTHER PUBLICATIONS

International Search Report dated Mar. 10, 2015 in PCT/SE2014/050768.

(Continued)

*Primary Examiner* — Mirellys Jagan
(74) *Attorney, Agent, or Firm* — Venable LLP; Jeffri A. Kaminski

(57) ABSTRACT

The present disclosure relates to an optical fiber sensor system (10) arranged to detect a temperature change in a zone (2, 3, 4) in an aircraft (1) having at least one zone (2, 3, 4). The optical fiber sensor system (10) comprises at least one optical fiber (11, 21, 31, 41) comprising a plurality of Fiber Bragg Gratings (20, 30, 40) for detecting a temperature change. Each of the Fiber Bragg Gratings (20, 30, 40) is reflecting radiation within a predetermined wavelength range. A radiation source unit (13) is arranged to emit radiation into the at least one optical fiber (11, 21, 31, 41). A radiation detector unit (14) is arranged to receive radiation from the at least one optical fiber (11, 21, 31, 41). A processing unit (15) is configured to identify a spectral response (22, 32, 42) of the received radiation and to determine a temperature change from the spectral response (22, 32, 42) of the received radiation in a predetermined wavelength range. Each of the at least one zone (2, 3, 4) solely has Fiber Bragg Gratings (20, 30, 40) which are reflecting radiation within the same predetermined wavelength range. The disclosure further relates to method for detecting a temperature change in a zone in an aircraft (Continued)

having at least one zone, by means of the optical fiber sensor system. Yet further the disclosure relates to an aircraft (1) comprising the optical fiber sensor system (10).

15 Claims, 9 Drawing Sheets

(51) Int. Cl.
*G01K 3/00* (2006.01)
*G01K 1/00* (2006.01)
*G01K 13/00* (2006.01)
*G01K 11/32* (2006.01)

(56) References Cited

U.S. PATENT DOCUMENTS

2005/0111793 A1 5/2005 Grattan et al.
2008/0285916 A1* 11/2008 Sappey ................ G01J 3/1895
385/27
2009/0072981 A1 3/2009 Powell
2013/0193961 A1* 8/2013 Wen ...................... G01J 1/0407
324/244.1

OTHER PUBLICATIONS

Written Opinion dated Mar. 10, 2015 in PCT/SE2014/050768.
International Preliminary Report on Patentability dated Jul. 11, 2016 in PCT/SE2014/050788.
Extended European Search Report in corresponding application No. 14896266.5 dated Dec. 6, 2017 (11 pages).

* cited by examiner

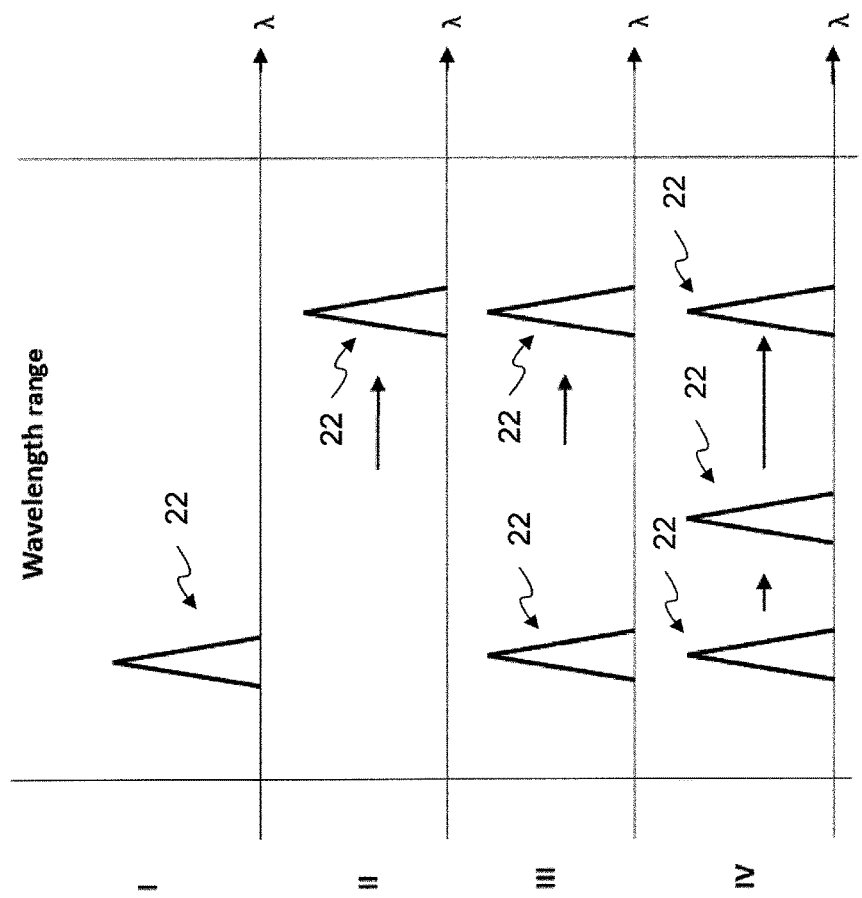

OPTICAL FIBER SENSOR SYSTEM FOR DETECTING TEMPERATURE CHANGES IN AN AIRCRAFT

CROSS-REFERENCE TO RELATED APPLICATIONS

This application is the U.S. National Stage of International Patent Application No. PCT/SE2014/050788, filed on Jun. 25, 2014. The entire contents of the foregoing application is incorporated herein by reference in its entirety.

TECHNICAL FIELD

The present disclosure relates to an optical fibre sensor system arranged to detect a temperature change in a zone in an aircraft.

BACKGROUND ART

It is well-known to measure temperature along an optical fibre by means of Fibre Bragg Gratings. According to prior art, a plurality of Fibre Bragg Gratings are inscribed along an optical fibre. Each Fibre Bragg Grating is active in its particular wavelength range within the electromagnetic spectrum and reflects a certain narrow wavelength band, within the particular wavelength range, depending on parameters like temperature, pressure, strain and indices of refraction. The reflected narrow wavelength band has a peak at the Bragg wavelength. A temperature change results in a shift of the peak wavelength. In order to avoid uncertainties regarding which Fibre Bragg Grating that contributes to a certain reflected peak wavelength, each Fibre Bragg Grating is given its unique wavelength range. Since a light source has a limited total wavelength range, only a limited number of Fibre Bragg Gratings with a unique wavelength range can be inscribed along each optical fibre.

The disadvantage with having a limited number of Fibre Bragg Gratings is that the number of measurement points may be small in relation to the length of the optical fibre. Therefore there is a risk to miss areas, between measurement points where a temperature change occurs. U.S. Pat. No. 6,204,920 solves the problem of having a limited number of measurement points by implementing further optical fibres, wherein the Fibre Bragg Gratings of the further optical fibres uses the same wavelength ranges as the Fibre Bragg Gratings of the first optical fibre. The sensor system is able to distinguish from which of the optical fibres that light has been received.

There is a need for a sensor system where further Fibre Bragg Gratings can be inscribed along one optical fibre without increasing the complexity of the system.

SUMMARY OF THE DISCLOSURE

The object of the present disclosure is to provide a sensor system for detecting a temperature change in a zone in an aircraft which increases the number of measurement points without increasing the complexity of the sensor system. This is accomplished by an optical fibre sensor system arranged to detect a temperature change in a zone in an aircraft having at least one zone. The optical fibre sensor system comprises at least one optical fibre comprising a plurality of Fibre Bragg Gratings for detecting a temperature change. Each of the Fibre Bragg Gratings is reflecting radiation within a predetermined wavelength range. A radiation source unit is arranged to emit radiation into the at least one optical fibre. A radiation detector unit is arranged to receive radiation from the at least one optical fibre. A processing unit is configured to identify a spectral response of the received radiation and to determine a temperature change from the spectral response of the received radiation in a predetermined wavelength range. Each of the at least one zone solely has Fibre Bragg Gratings which are reflecting radiation within the same predetermined wavelength range.

An advantage of that each of the at least one zone solely has Fibre Bragg Gratings which are reflecting radiation within the same predetermined wavelength range is that an extended number of Fibre Bragg Gratings can be inscribed along the at least one optical fibre without increasing the complexity of the sensor system. A further advantage of that each of the at least one zone solely has Fibre Bragg Gratings which are reflecting radiation within the same predetermined wavelength range is that it is possible to receive a faster response from critical points along the optical fibre since an increased number of Fibre Bragg Gratings can be inscribed.

According to one aspect of the disclosure, Fibre Bragg Gratings of each of the other zones are reflecting radiation within a different predetermined wavelength.

According to a further aspect of the disclosure, the processing unit is further configured to determine at least one Bragg wavelength of the spectral response and to match the at least one Bragg wavelength to the zone which solely has Fibre Bragg Gratings which are reflecting radiation within the corresponding predetermined wavelength range.

According to yet a further aspect of the disclosure, each of the at least one Bragg wavelength of the spectral response is determined by identifying a rising or falling edge of the spectral response. An advantage of identifying a rising or falling edge of the spectral response is that no advanced analysing technology is needed to distinguish peaks if several Bragg wavelengths are overlapping each other.

According to another aspect, the processing unit is configured to monitor the temperature in each zone separately. An advantage of monitoring the temperature in each zone separately is that it is possible to monitor each zone independently.

According to a further aspect of the disclosure, the aircraft comprises an alarm unit coupled to the optical fibre sensor system which indicates in which zone the temperature passes a temperature threshold. An advantage of indicating in which zone the temperature passes a temperature threshold is that it is possible to detect in which zone a temperature change occurs.

According to a yet further aspect of the disclosure, each of the Fibre Bragg Gratings in each of the at least one zone has a unique spectral response within that corresponding predetermined wavelength range. An advantage of that each of the Fibre Bragg Gratings in each of the at least one zone has a unique spectral response is that it is possible to distinguish which of the Fibre Bragg Gratings that measure a changed temperature by determining that the unique spectral response of that Fibre Bragg Grating moves. Thus, it is possible to detect where in a zone a temperature change occurs.

According to another aspect of the disclosure, each of the at least one zone comprises at least four Fibre Bragg Gratings. An advantage of that each of the at least one zone comprises at least four Fibre Bragg Gratings is that it is possible to increase the measurement points without introducing further complexity into the sensor system.

According to a further aspect of the disclosure, the processing unit is further configured to analyse how the temperature in each of the zones changes by analysing the speed at which each of the Bragg wavelengths of the spectral response moves. An advantage of analysing the speed at which each of the Bragg wavelengths of the spectral response moves is that it is possible to detect how fast and how much the temperature at each measurement point in the zones changes. Further it is possible to monitor how the temperature change spreads at different measurement points within the respective zone. Thus, it is possible to make a qualified assumption regarding what causes the temperature change.

According to a yet further aspect of the disclosure, one of the at least one optical fibre extends along a plurality of the zones. An advantage of an optical fibre extending along a plurality of the zones is that a plurality of different zones can be monitored by one optical fibre.

Further, the disclosure relates to a method for detecting a temperature change in a zone in an aircraft having at least one zone, by means of the optical fibre sensor system.

Yet further, the disclosure relates to an aircraft comprising the optical fibre sensor system.

The disclosure also relates to the use of the optical fibre sensor, wherein the optical fibre sensor system detects a hot air leakage from a pipe comprising hot air. Further the disclosure relates to the use of the optical fibre sensor, wherein the optical fibre sensor system detects a temperature change in a fuel tank.

BRIEF DESCRIPTION OF FIGURES

The disclosure will be further described with reference to the accompanying drawings.

FIG. 2b illustrates an example of a spectral response from an optical fibre located within a zone in the aircraft, according to the disclosure.

DETAILED DESCRIPTION

Figure 1:
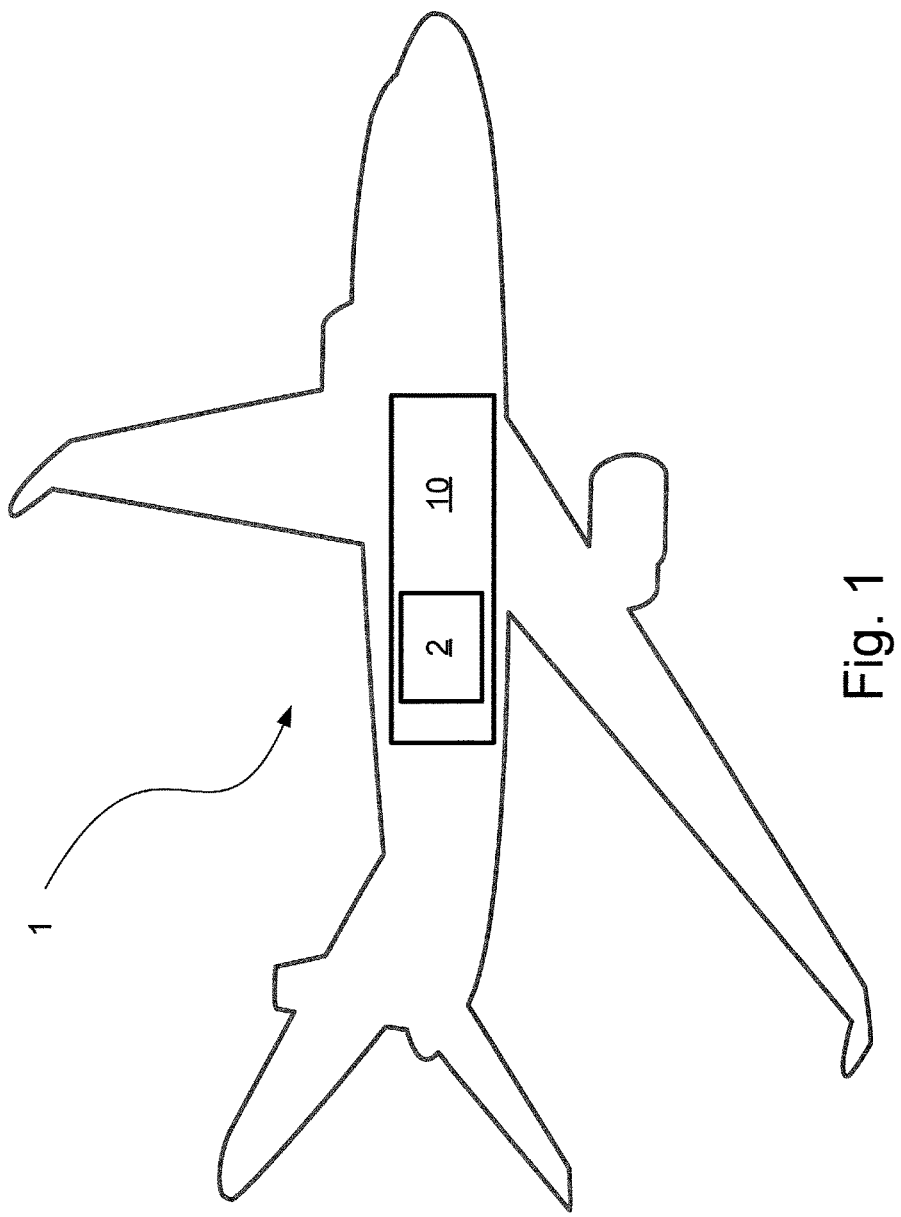
FIG. 1 illustrates an aircraft with one zone according to the disclosure.

FIG. 1 illustrates an aircraft 1 with one zone 2. The aircraft 1 comprise an optical fibre sensor system 10. The zone 2 may cover any volume within the aircraft 1 or on the surface of the aircraft 1. The whole optical fibre sensor system 10 does not have to be arranged within the zone 2.

The expression "zone in an aircraft" is not considered to be restricted to a zone within the aircraft. The expression "zone in an aircraft" is considered to also cover a zone which is located on the surface of the aircraft.

Figure 2A:
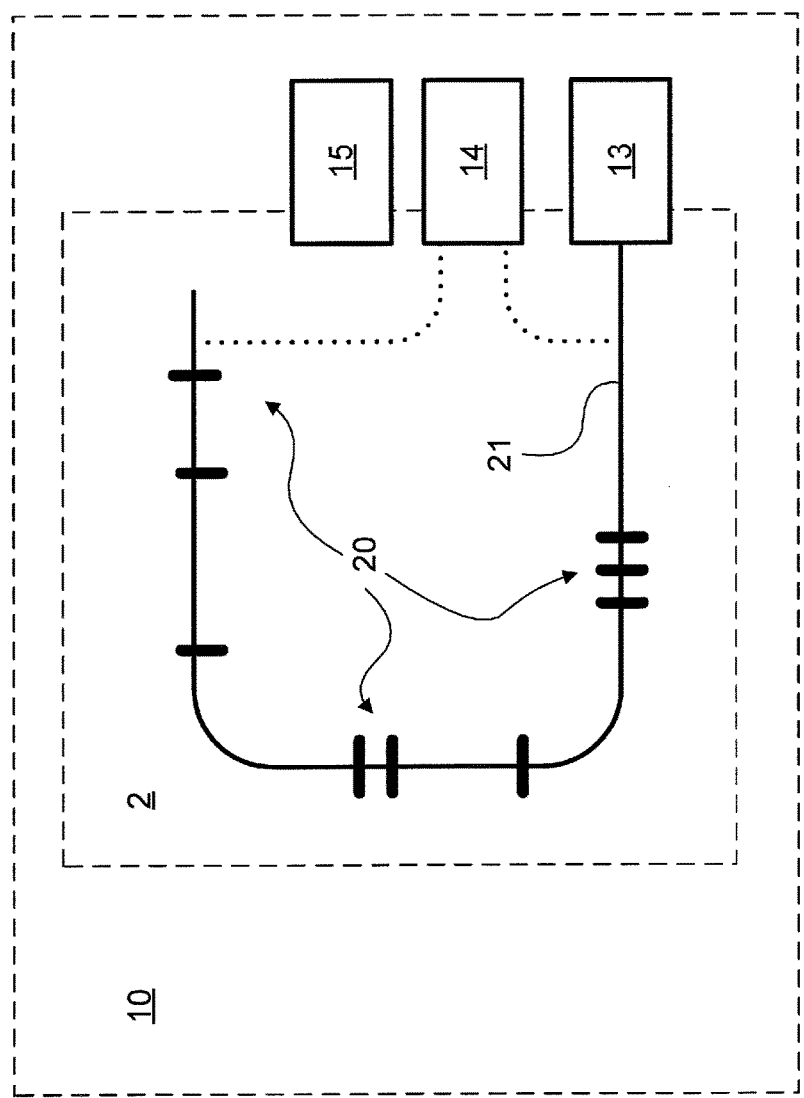
FIG. 2a illustrates an optical fibre sensor system, according to the disclosure, having an optical fibre located within a zone in the aircraft.

FIG. 2a illustrates the optical fibre sensor system 10 having an optical fibre 21 located within the zone 2 in the aircraft 1. The optical fibre 21 extends from a radiation source unit 13. The optical fibre 21 comprises a plurality of Fibre Bragg Gratings 20. Each of the Fibre Bragg Gratings 20 is constructed in a segment of the optical fibre 21. All the Fibre Bragg Gratings 20 within the zone 2 reflect radiation within the same predetermined wavelength range. The radiation source unit 13 is arranged to emit radiation into the optical fibre 21. A radiation detector unit 14 is arranged to receive radiation from the optical fibre 21. According to an embodiment, the radiation detector unit 14 receives radiation which is reflected from the optical fibre 21. According to another embodiment, the radiation detector unit 14 is arranged on the opposite end of the optical fibre 21 relative the radiation source unit 13. If the radiation detector unit 14 is arranged on the opposite end of the optical fibre 21 relative the radiation source unit 13, the radiation detector unit 14 receives radiation which passes through the optical fibre 21 without being reflected or absorbed. A processing unit 15 is configured to determine a temperature change received radiation. The processing unit 15 is connected to the radiation detector unit 14 and to the radiation source unit 13.

FIG. 2b illustrates an example of a spectral response 22 from the optical fibre 21 located within the zone 2 in the aircraft 1. The spectral response 22 comprises information regarding which wavelengths of the radiation that has been reflected by a Fibre Bragg Grating 20 if the radiation detector unit 14 receives radiation which is reflected from the optical fibre 21. Alternatively, but not shown in FIG. 2b, the spectral response 22 may comprise information regarding which wavelengths of the radiation that has passed through all the Fibre Bragg Grating 20, if the radiation detector unit 14 is arranged on the opposite end of the optical fibre 21 relative the radiation source unit 13. A described above, the processing unit 15 is configured to determine a temperature change from the received radiation. It is possible to determine a temperature change by analysing the spectral response 22 from the optical fibre 21.

According to an embodiment of the disclosure, all the Fibre Bragg Gratings 20 within the zone 2 are identical in that the Fibre Bragg Gratings 20 within the zone 2 has identical spectral responses 22 when the temperature is the same at all Fibre Bragg Gratings 20 within the zone 2.

FIG. 2b illustrates four examples of spectral responses 22. Each of Fibre Bragg Gratings 20 within the zone 2 reflects radiation within a predetermined wavelength range. Each Fibre Bragg Grating 20 is represented by a peak at a certain wavelength of the spectral responses 22, the certain wavelength being the Bragg wavelength of each Fibre Bragg Grating 20. The peaks are only for illustrative purpose. It should be noticed that the spectral response 22 for each Fibre Bragg Grating 20 may have any other shape. The Bragg wavelength for each peak within the predetermined wavelength range corresponds to a certain measured temperature. Instead of measuring the temperature at the peak, it is possible to measure at a rising or a falling edge of the spectral response 22. It is especially advantageous to measure the temperature at a rising/falling edge of the spectral response 22 if the spectral responses 22 from several Fibre Bragg Gratings 20 are overlapping each other so that it is difficult to distinguish any peak. Case I shows an example of a spectral response 22 where all Fibre Bragg Gratings 20 measure a normal temperature. All peaks of the spectral response 22 are at a low wavelength. Case II shows an example of a spectral response 22 where all Fibre Bragg Gratings 20 measure a higher temperature. This can be seen in that all peaks of the spectral response 22 are at a higher wavelength. Case III shows an example of a spectral response 22 where only some Fibre Bragg Gratings 20 measure a higher temperature. This can be seen in that some peaks are at a lower wavelength and some peaks are at a higher wavelength. It is not possible to determine which of the Fibre Bragg Gratings 20 that measures a higher temperature. On the other hand, it is possible to determine if the measured temperature is above a certain level somewhere in the zone 2. Case IV shows an example of a spectral response 22 where at least one Fibre Bragg Gratings 20 measures a low temperature, at least one Fibre Bragg Gratings 20 measures a medium temperature and at least one Fibre Bragg Gratings 20 measures a high temperature.

Figure 2C:
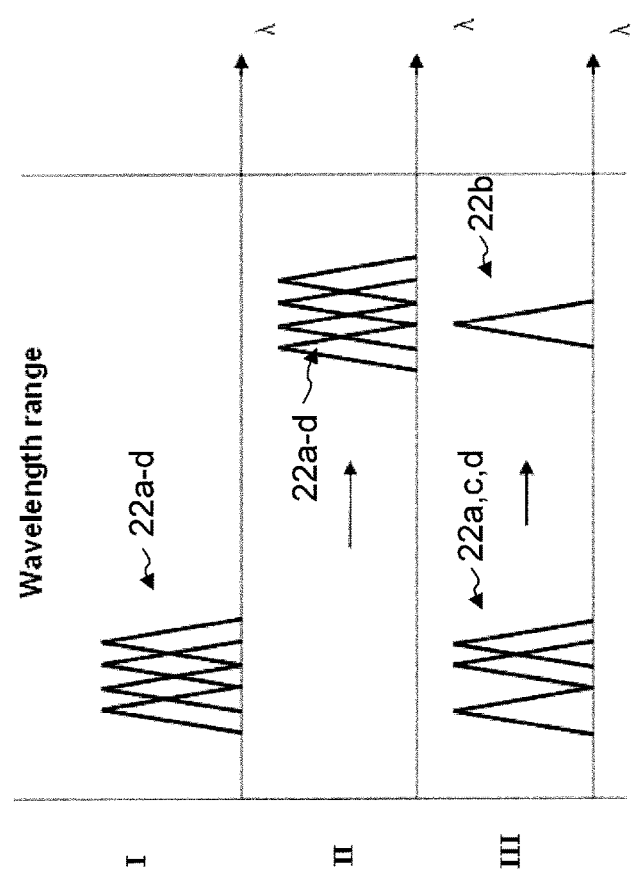
FIG. 2c illustrates an example of a spectral response, according to an alternative embodiment of the disclosure, wherein each of the Fibre Bragg Gratings has a unique spectral response.

FIG. 2c illustrates an example of a spectral response 22a-d according to an alternative embodiment of the disclosure wherein each of the Fibre Bragg Gratings 20 in the zone 2 has a unique spectral response 22a, 22b, 22c, 22d. FIG. 2c incorporates the features described in the description in related to FIG. 2b with the difference that each of the Fibre Bragg Gratings 20 has a unique spectral response 22a, 22b, 22c, 22d. Since each of the Fibre Bragg Gratings 20 has a unique spectral response 22a, 22b, 22c, 22d it is possible to determine where in the zone 2 a temperature change occur. Each Fibre Bragg Grating 20 is represented by a peak at a certain wavelength of the spectral responses 22a, 22b, 22c, 22d. The peaks are only for illustrative purpose. It should be noticed that the spectral response 22a, 22b, 22c, 22d for each Fibre Bragg Grating 20 may have any other shape.

Figure 3:
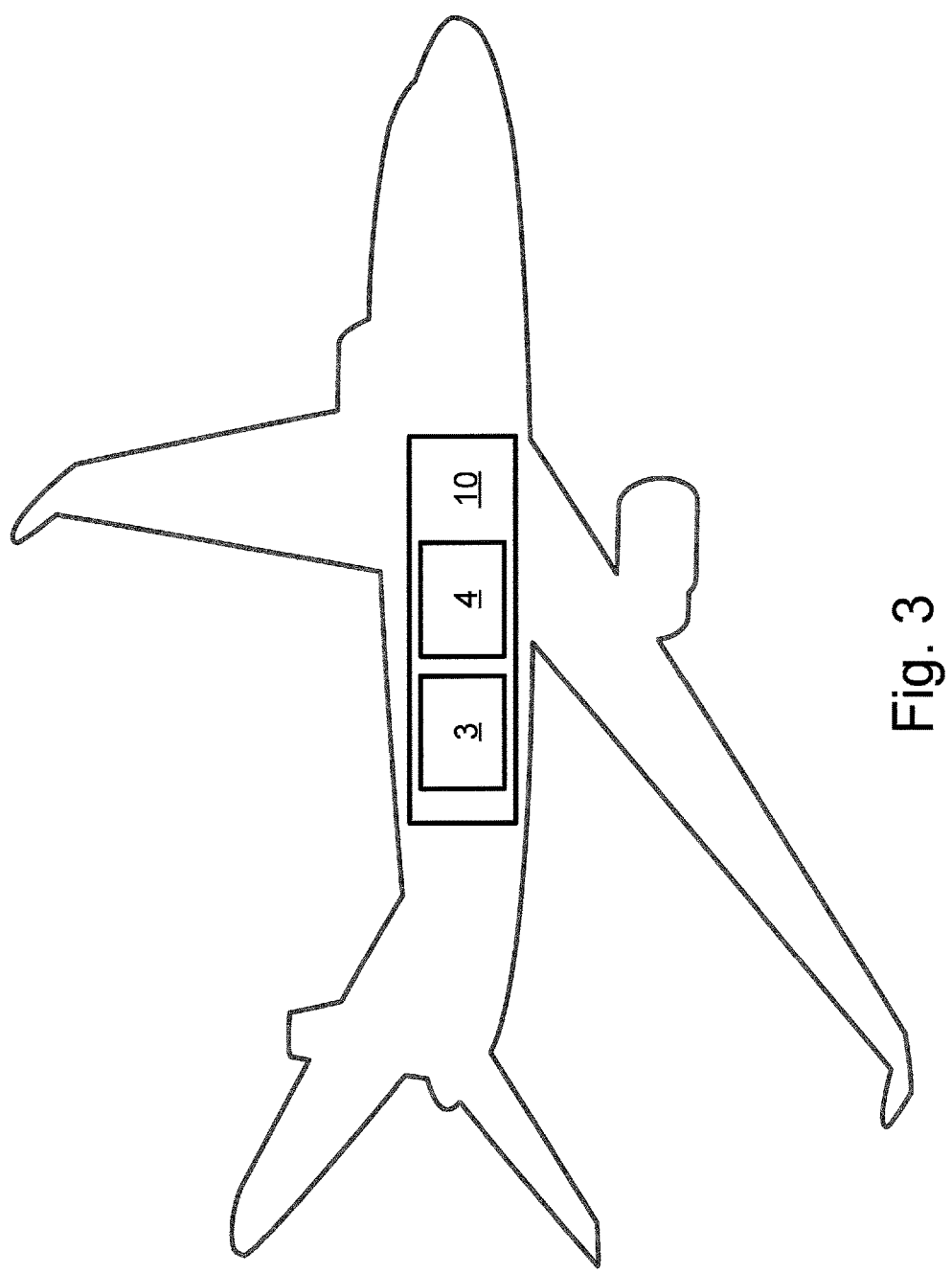
FIG. 3 illustrates an aircraft with two zones according to first and second embodiments of the disclosure the disclosure.

FIG. 3 illustrates an aircraft 1 with two zones, a first zone 3 and a second zone 4. The aircraft 1 comprise an optical fibre sensor system 10. The zones 3, 4 may cover any volume within the aircraft 1 or on the surface of the aircraft 1. The whole optical fibre sensor system 10 does not have to be arranged within the zones 3, 4.

Figure 4A:
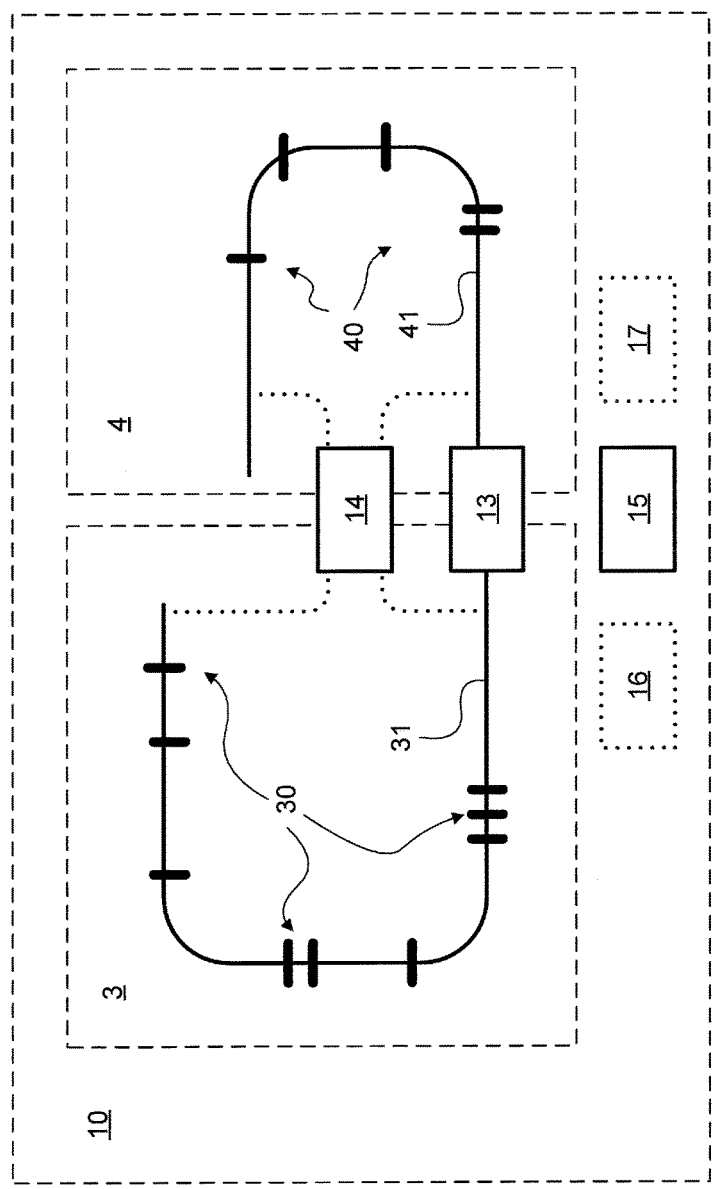
FIG. 4a illustrates an optical fibre sensor system, according to a first embodiment of the disclosure, having two optical fibres, each of which are located within a zone in the aircraft.

FIG. 4a illustrates the optical fibre sensor system 10, according to an embodiment of the disclosure, having two optical fibres 31, 41, each of which are located within one of the zones 3, 4 in the aircraft 1.

The optical fibre 31 extends from a radiation source unit 13. The optical fibre 31 comprises a plurality of Fibre Bragg Gratings 30. Each of the Fibre Bragg Gratings 30 is constructed in a short segment of the optical fibre 31. All the Fibre Bragg Gratings 30 within the first zone 3 reflect radiation within the same predetermined wavelength range. The radiation source unit 13 is arranged to emit radiation into the optical fibre 31. The radiation detector unit 14 is arranged to receive radiation from the optical fibre 31. According to an embodiment, the radiation detector unit 14 receives radiation which is reflected from the optical fibre 31. According to another embodiment, the radiation detector unit 14 is arranged on the opposite end of the optical fibre 31 relative the radiation source unit 13. If the radiation detector unit 14 is arranged on the opposite end of the optical fibre 31 relative the radiation source unit 13, the radiation detector unit 14 receives radiation which passes through the optical fibre 31 without being reflected or absorbed.

The optical fibre 41 extends from a radiation source unit 13. The optical fibre 41 comprises a plurality of Fibre Bragg Gratings 40. Each of the Fibre Bragg Gratings 40 is constructed in a short segment of the optical fibre 41. All the Fibre Bragg Gratings 40 within the second zone 4 reflect radiation within the same predetermined wavelength range. The predetermined wavelength range of the second zone 4 is different than the predetermined wavelength range of the first zone 3. The radiation source unit 13 is arranged to emit radiation into the optical fibre 41. The radiation detector unit 14 is arranged to receive radiation from the optical fibre 41. According to an embodiment, the radiation detector unit 14 receives radiation which is reflected from the optical fibre 41. According to another embodiment, the radiation detector unit 14 is arranged on the opposite end of the optical fibre 41 relative the radiation source unit 13. If the radiation detector unit 14 is arranged on the opposite end of the optical fibre 41 relative the radiation source unit 13, the radiation detector unit 14 receives radiation which passes through the optical fibre 41 without being reflected or absorbed.

The processing unit 15 is configured to determine a temperature change received radiation. The processing unit 15 is connected to the radiation detector unit 14 and to the radiation source unit 13. According to an embodiment, the optical fibre sensor system 10 comprises a storage unit 16. The storage unit 16 comprises data regarding all the different types of Fibre Bragg Gratings 20, 30, 40. Further, the storage unit 16 may comprise data regarding how the temperature affects the reflected wavelength for each of the different type of Fibre Bragg Gratings 20, 30, 40. According to another embodiment, the optical fibre sensor system 10 comprises an alarm unit 17. The alarm unit 17 indicates in which zone 3, 4 the temperature passes a temperature threshold. The alarm unit 17 may comprise a warning display and/or to an audible alarm which indicates to a pilot that the temperature passes a temperature threshold in a certain zone.

Figure 4B:
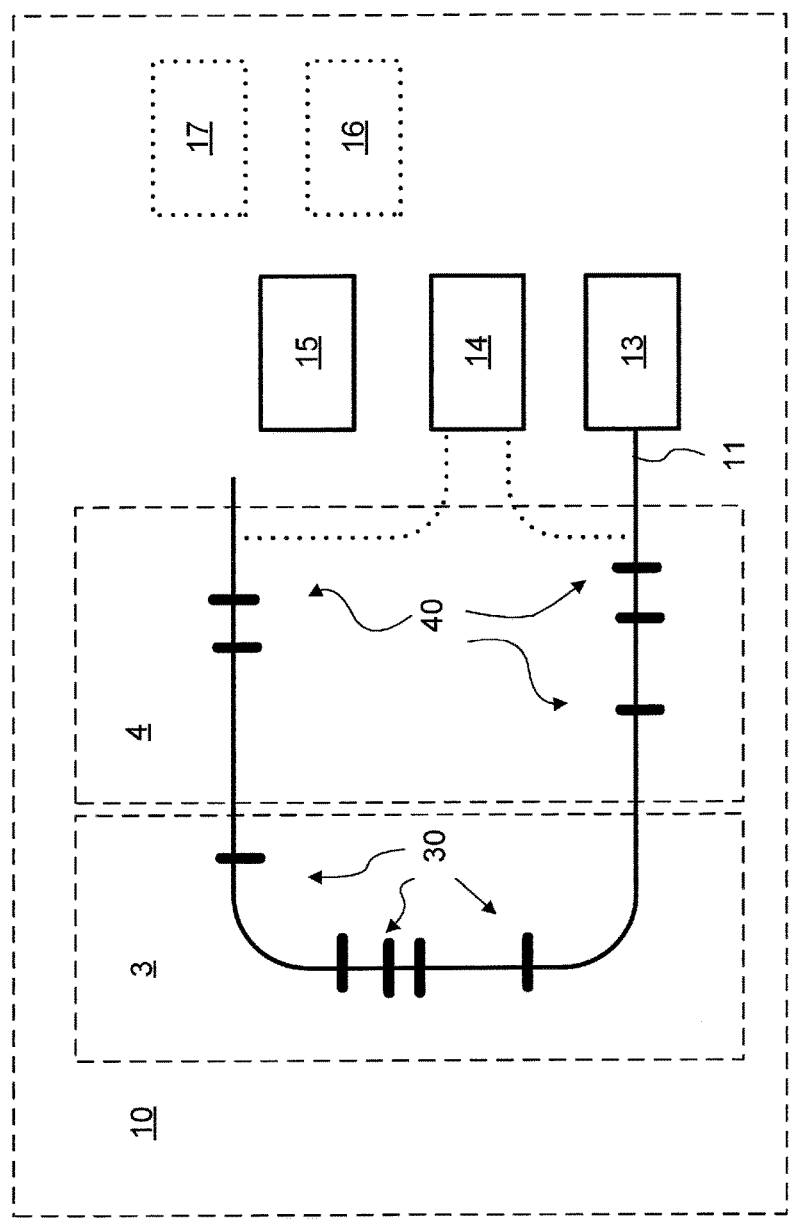
FIG. 4b illustrates an optical fibre sensor system, according to a second embodiment of the disclosure, having an optical fibre extending through a plurality of zones in the aircraft.

FIG. 4b illustrates an optical fibre sensor system 10, according to a second embodiment of the disclosure, having an optical fibre 11 extending through a plurality of zones 3, 4 in the aircraft. FIG. 4b incorporates the features described in the description in related to FIG. 4a with the difference that only one optical fibre 11 is present and that the optical fibre 11 extends through both the first zone 3 and the second zone 4. The optical fibre 11 may pass through each zone a plurality of times.

Figure 4C:
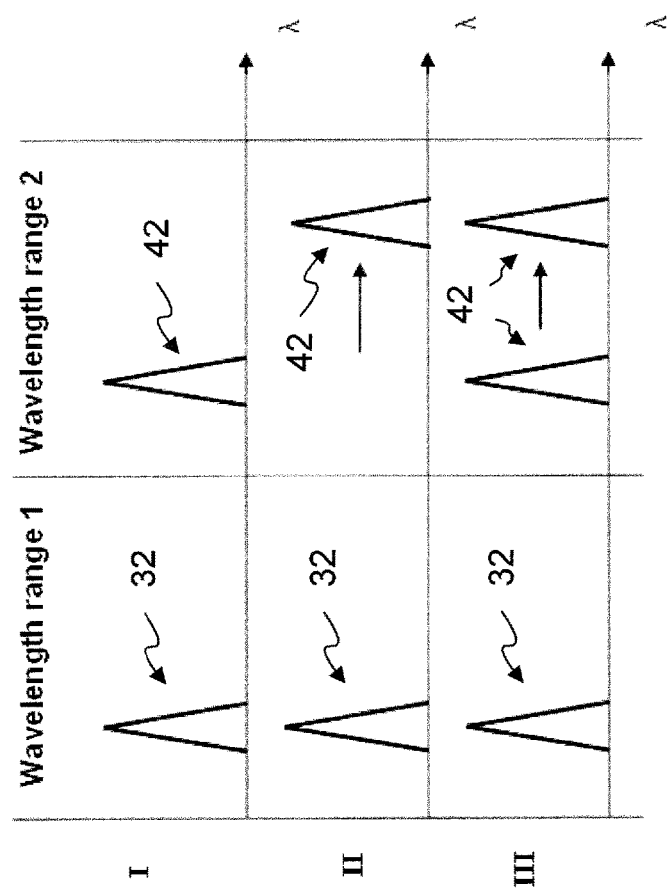
FIG. 4c illustrates an example of a spectral response according to the first or second embodiments of the disclosure.

FIG. 4c illustrates an example of a spectral response 32, 42 from the optical fibre 11, 31, 41 located within the first zone 3 and the second zone 4 in the aircraft 1. The spectral response 32, 42 comprises information regarding which wavelengths of the radiation that has been reflected by a Fibre Bragg Grating 30, 40 if the radiation detector unit 14 receives radiation which is reflected from the optical fibre 11, 31, 41.

FIG. 4c illustrates three examples of spectral responses 32, 42 for both of the zones 3, 4 described in FIG. 4a and FIG. 4b. Each of Fibre Bragg Gratings 30 within the first zone 3 reflects radiation within a predetermined wavelength range, Wavelength range 1. Each of Fibre Bragg Gratings 40 within the second zone 4 reflects radiation within another predetermined wavelength range, Wavelength range 2.

For illustrative purposes in FIG. 4c, and according to an embodiment of the disclosure, all the Fibre Bragg Gratings 30 within the first zone 3 are identical in that the Fibre Bragg Gratings 30 within the first zone 3 has identical spectral responses 32 when the temperature is the same at all Fibre Bragg Gratings 30 within the first zone 3. Further, all the Fibre Bragg Gratings 40 within the second zone 4 are identical in that the Fibre Bragg Gratings 40 within the second zone 4 have identical spectral responses 32 when the temperature is the same at all Fibre Bragg Gratings 40 within the second zone 4.

Each Fibre Bragg Grating 30, 40 is represented by a peak at a certain wavelength of the spectral responses 32, 42. The peaks are only for illustrative purpose. It should be noticed that the spectral response 32, 42 for each Fibre Bragg Grating 30, 40 may have any other shape. The wavelength for each peak within that predetermined wavelength range corresponds to a certain measured temperature. Instead of measuring the temperature at the peak, it is possible to measure at a rising or a falling edge of the spectral response 32, 42. It is especially advantageous to measure the temperature at a rising/falling edge of the spectral response 32, 42 if the spectral responses 32, 42 from several Fibre Bragg Gratings 30, 40 are overlapping each other so that it is difficult to distinguish any peak. Case I shows an example of a spectral response 32, 42 where all Fibre Bragg Gratings 20 measure a normal temperature. All peaks of the spectral response 32, 42 are at a low wavelength. Case II shows an example of a spectral response 32, 42 where all Fibre Bragg Gratings 30 in the first zone 3 measure a normal temperature and all Fibre Bragg Gratings 40 in the second zone 4 measure a higher temperature. This can be seen in that all peaks of the spectral response 42 are at a higher wavelength compared to in Case I. Case III shows an example of a spectral response 32, 42 where only some Fibre Bragg Gratings 40 in the second zone 4 measure a higher temperature and here all Fibre Bragg Gratings 30 in the first zone 3 measure a normal temperature. This can be seen in the spectral response 42 of the second zone 4 in that some peaks are at a lower wavelength and some peaks are at a higher wavelength. It is not possible to determine which of the Fibre Bragg Gratings 40 that measures a higher temperature. On the other hand, it is possible to determine if the measured temperature is above a certain level somewhere in the zone 4.

According to an embodiment, the storage unit 16 is configured to store temperature specific data of the Fibre Bragg Gratings 20, 30, 40 in each zone 2, 3, 4. The storage unit 16 is configured to store data regarding said at least one zone 2, 3, 4 and at least one predetermined wavelength range. The processing unit 15 is further configured to determine a temperature change in said at least one zone 2, 3, 4 by comparing said spectral response 22, 32, 42 of the received radiation with the temperature specific data of the Fibre Bragg Gratings 20, 30, 40 in each zone 2, 3, 4.

According to an alternative embodiment, the at least one optical fibre 11, 21, 31 extend(s) along a pipe comprising hot air. The pipe has a plurality of critical places. The critical places are normally situated around a joint or a universal joint of the pipe. Further, the pipe may pass nearby hot units in the aircraft, such as motors. If any of the Fibre Bragg Gratings 20, 30, 40 measures a temperature rises above a critical value an alarm from the alarm unit 17 is given. The alarm indicates in which zone 2, 3, 4 the critical temperature was surpassed.

According to an alternative embodiment, the at least one optical fibre 11, 21, 31 extend(s) along a frame of the aircraft 1. If any of the Fibre Bragg Gratings 20, 30, 40 measures a temperature falls under a critical value an alarm from the alarm unit 17 is given. The alarm indicates in which zone 2, 3, 4 the critical temperature was passed. Further, the temperature in a fuel tank can be measured in a similar way, by extending the at least one optical fibre 11, 21, 31 into the fuel tank.

The optical fibre sensor system 10 may comprise any number of zones 2, 3, 4, any number of optical fibres 11, 21, 31 and any number of Fibre Bragg Gratings 20, 30, 40. According to an illustrative example of an embodiment of the disclosure, the optical fibre sensor system 10 comprises Fibre Bragg Gratings 20, 30, 40 along two optical fibres 21, 31. The Fibre Bragg Gratings 20, 30, 40 in each of the zones 2, 3, 4 are inscribed so that each of the wavelength ranges can measure a temperature between −60° C. and 620° C. The radiation source unit 13 radiates with a wavelength of either about 800 nm or 1560 nm. The total wavelength span of the radiation used for measuring temperature is 80 nm. Thus, the wavelength span is between 1520-1600 nm. A Fibre Bragg Grating 20, 30, 40 active in the wavelength span of 1560 nm varies about 8 nm when its temperature changes from −60° C. and 620° C. Given the above stated specifications, the total wavelength span of 80 nm used for measuring temperature may comprise up to 10 wavelength ranges. If there are more than 10-20 Fibre Bragg Gratings 20, 30, 40 in a zone 2, 3, 4 the measurement quality may decrease due to reflections from Fibre Bragg Gratings 20, 30, 40 positioned earlier along the optical fibre 11, 21, 31. The temperatures of the Fibre Bragg Gratings 20, 30, 40 may be determined by image analysis or image processing. The image analysis or image processing is at least partly taking place in the processing unit 15. A spectrometer or a Fabry-Pérot interferometer may as the radiation detector unit 14 or as part of the radiation detector unit 14.

According to an alternative embodiment, the speed and extent of a pipe leak can be determined by analysing how fast the peaks in a wavelength range of the spectral response 22, 32, 42 moves. Each peak corresponds to a temperature dependent Bragg wavelength. If only one peak in a zone 2, 3, 4 moves rapidly to a higher wavelength, it may be an indication that the temperature rises rapidly only in the vicinity of one Fibre Bragg Grating 20, 30, 40. On the other hand, if all peak in a zone 2, 3, 4 moves rapidly to a higher wavelength, it is an indication that the temperature rises rapidly in the whole zone 2, 3, 4. Further, by examining the speed of which the peaks of the spectral response 22, 32, 42 moves, it is possible to make a qualified assumption regarding what causes the temperature change in the specific zone 2, 3, 4. The storage unit 16 comprises stored temperature data regarding how a certain malfunction in the actual zone 2, 3, 4 affects the temperature in the actual zone 2, 3, 4. The processing unit 15 is configured to compare the measured temperature data with the stored temperature data and to draw conclusions regarding possible malfunctions in the specific zone 2, 3, 4.

Figure 5:
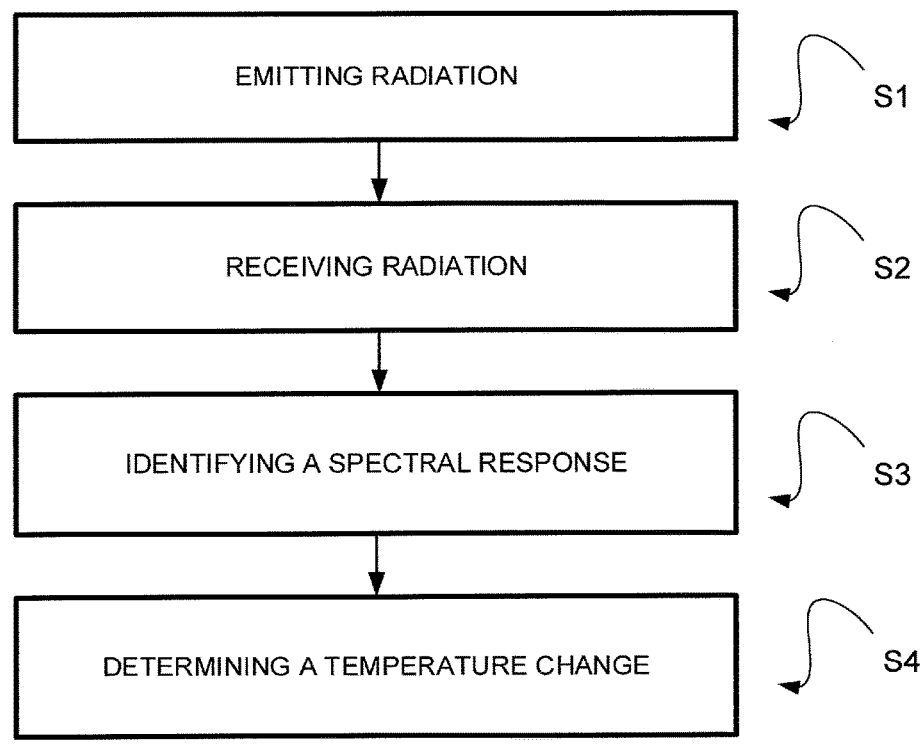
FIG. 5 illustrates a method according to the disclosure.

FIG. 5 illustrates a method for detecting a temperature change in a zone in an aircraft according to any previously described embodiment of the disclosure. The first step is emitting S1, from a radiation source unit, radiation into the at least one optical fibre. The second step is receiving S2, by a radiation detector unit, radiation from the at least one optical fibre. The third step is identifying S3, by a processing unit, a spectral response of the received radiation. The fourth step is determining S4, by a processing unit, a temperature change from the spectral response of the received radiation in a predetermined wavelength range.

According to an embodiment, the method further comprise the steps of determining at least one reflection peak of the spectral response and matching the at least one reflection peak to the zone which solely has Fibre Bragg Gratings which are reflecting radiation within the corresponding predetermined wavelength range.

Any of the zones 2, 3, 4 in the aircraft 1 may be defined by an enclosed space in the aircraft 1. Further, any of the zones 2, 3, 4 in the aircraft 1 may be defined by a delimited space. The delimited space defining a zone 2, 3, 4 may be located so as to enclose a motor, a part of a pipe, a fuel tank or a part on the surface of the aircraft 1. It should be noticed that any of the zones 2, 3, 4 may be located so as to enclose any part within or in the surface of the airplane 1.

The invention claimed is:

1. An optical fibre sensor system arranged to detect a temperature change in a zone in an aircraft having at least one zone, the optical fibre sensor system comprising:
    at least one optical fibre comprising a plurality of Fibre Bragg Gratings for detecting a temperature change, wherein each of the Fibre Bragg Gratings is reflecting radiation within a predetermined wavelength range;
    a radiation source unit arranged to emit radiation into the at least one optical fibre;
    a radiation detector unit arranged to receive radiation from the at least one optical fibre;
    the processing unit configured to identify a spectral response of the received radiation and to determine a temperature change from the spectral response of the received radiation in a predetermined wavelength range;
    wherein each of the at least one zone solely has Fibre Bragg Gratings which are reflecting radiation within the same predetermined wavelength range; and
    each of at least one Bragg wavelength of the spectral response is determined by identifying a rising or falling edge of the spectral response.

2. The optical fibre sensor system according to claim 1, wherein Fibre Bragg Gratings of each of the other zones are reflecting radiation within a different predetermined wavelength.

3. The optical fibre sensor system according to claim 1, wherein the processing unit is configured to monitor the temperature in each zone separately.

4. The optical fibre sensor system according to claim 1, wherein the aircraft comprises an alarm unit coupled to the optical fibre sensor system which indicates in which zone the temperature passes a temperature threshold.

5. The optical fibre sensor system according to claim 1, wherein each of the Fibre Bragg Gratings in each of the at least one zone has a unique spectral response within that corresponding predetermined wavelength range.

6. The optical fibre sensor system according to claim 1, wherein each of the at least one zone comprises at least four Fibre Bragg Gratings.

7. The optical fibre sensor system according to claim 1, wherein one of the at least one optical fibre extends along a plurality of the zones.

8. The optical fibre sensor system according to claim 1, wherein the processing unit is further configured to determine at least one Bragg wavelength of the spectral response and to match the at least one Bragg wavelength to the zone which solely has Fibre Bragg Gratings which are reflecting radiation within the corresponding predetermined wavelength range.

9. The optical fibre sensor system according to claim 8, wherein the processing unit is further configured to analyse analyze how the temperature in each of the zones changes by analyzing the speed at which each of the Bragg wavelengths of the spectral response moves.

10. An aircraft comprising an optical fibre sensor system according to claim 1.

11. Use of the optical fibre sensor system arranged to detect a temperature change in a zone in an aircraft according to claim 1, wherein the optical fibre sensor system detects a hot air leakage in the zone from a pipe comprising hot air.

12. Use of the optical fibre sensor system arranged to detect a temperature change in a zone in an aircraft according to claim 1, wherein the optical fibre sensor system detects a temperature change in a fuel tank in the zone.

13. A method for detecting a temperature change in a zone in an aircraft having at least one zone, by means of an optical fibre sensor system, the optical fibre sensor system comprising at least one optical fibre comprising a plurality of Fibre Bragg Gratings for detecting a temperature change, wherein each of the Fibre Bragg Gratings is reflecting radiation within a predetermined wavelength range, the method comprising the steps of;
    emitting, from a radiation source unit, radiation into the at least one optical fibre;
    receiving, by a radiation detector unit, radiation from the at least one optical fibre;
    identifying, by a processing unit, a spectral response of the received radiation;
    determining, by a processing unit, a temperature change from the spectral response of the received radiation in a predetermined wavelength range;
    wherein each of the at least one zone solely has Fibre Bragg Gratings which are reflecting radiation within the same predetermined wavelength range; and
    determining each of at least one Bragg wavelength of the spectral response by identifying a rising or falling edge of the spectral response.

14. The method according to claim 13, wherein Fibre Bragg Gratings of each of the other zones are reflecting radiation within a different predetermined wavelength.

15. The method according to claim 13, wherein the method further comprises the steps of:
    determining at least one Bragg wavelength of the spectral response; and
    matching the at least one Bragg wavelength to the zone which solely has Fibre Bragg Gratings which are reflecting radiation within the corresponding predetermined wavelength range.

* * * * *